Figure 1:
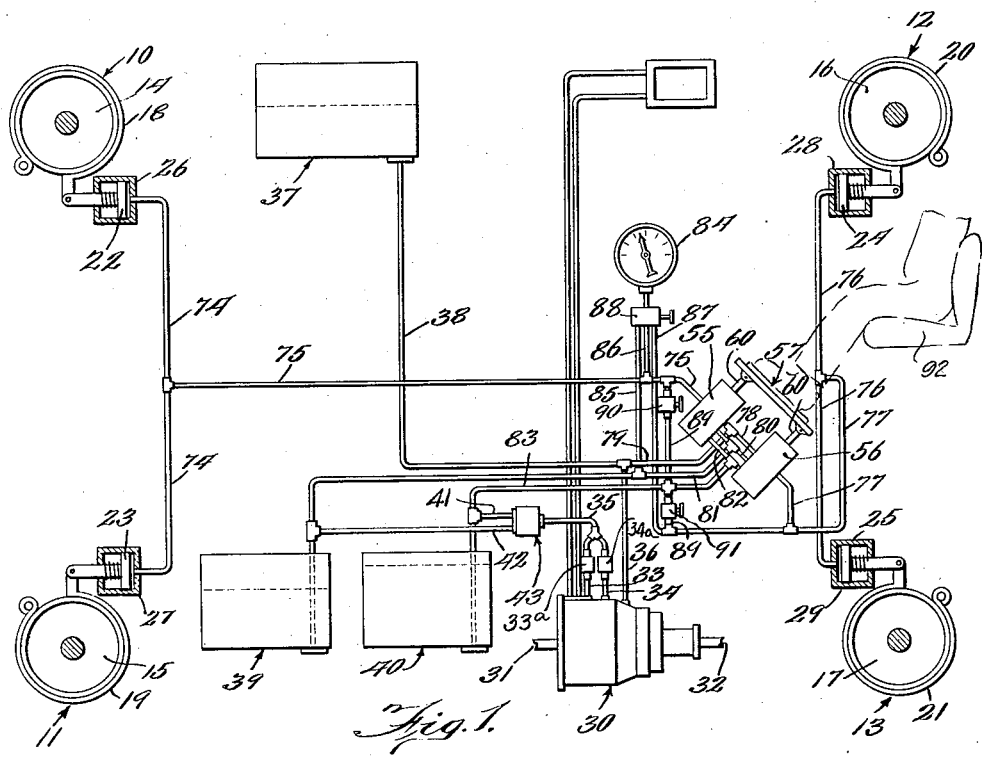

April 23, 1935.  T. A. BANNING, JR  1,998,650

VEHICLE BRAKE SYSTEM

Original Filed July 11, 1933

Inventor:
Thomas A. Banning Jr.

UNITED STATES PATENT OFFICE 1,998,650

VEHICLE BRAKE SYSTEM

Thomas A. Banning, Jr., Wilmette, Ill., assignor to Bendix Brake Company, South Bend, Ind., a corporation of Illinois Original application July 11, 1923, Serial No. 650,773. Divided and this application January 30, 1928, Serial No. 250,621

48 Claims. (Cl. 188—152)

This invention has reference to improvements in brake systems for vehicles, and especially it has reference to brake systems for automotive vehicles such as aerial vehicles, automobiles, trucks, coaches, and the like. It will be understood, however, that the features of the invention are of general usefulness, and their use is not limited to the foregoing applications, except insofar as the same may be limited in the claims to be included herein.

Generally speaking, the present invention refers to improvements in brakes of such a nature as to greatly improve the freedom of control of said brakes by the driver of the vehicle, and which improvements will make it possible for the driver to more easily and completely select the application of the brakes and the braking action of the different wheels according to the driving and road conditions actually existing during the braking action. These improvements will also result in a servo-motor or power actuation of the brakes, but under conditions such as to give to the driver at all times a reaction or feel which will be in strict accord with the amount of braking action which is being momentarily exerted at the wheels.

One feature of the invention refers to an arrangement whereby there is at all times created on the driver's foot or other control pedal a reaction which is exactly in proportion to the braking action being exerted on the wheel drums or brake members, so that the driver will be at all times informed as to the amount of the braking action, notwithstanding the fact that the power for actuating the brakes may be derived from another source than the driver, such as hydraulic pressure or air pressure from a pump. The arrangement is such that as the operating medium, such as the air or oil under pressure, is introduced into the brake cylinders under the control of the driver, there is built up and maintained in the driver's control element, such as the foot pedal, a reaction which is proportionate to the braking pressure. Said reaction thus serves to give to the driver a "feel" which informs him at all times as to the amount of the braking action being exerted, and such information is given to the driver directly, and irrespective of the deceleration of the vehicle actually resulting from the brake application. Such "feel" is similar to that which the driver experiences when applying the brakes of a mechanically braked vehicle or a vehicle of the hydraulic brake type in which the power for actuating the brakes is derived only from the driver's foot, instead of by the use of a pump.

Another feature of the invention refers to improvements in four-wheel brakes whereby the braking effort for each pair of wheels may be controlled independently of that for the other pair, or in which both pairs of wheels may be braked simultaneously, and with either equal or unequal braking actions. That is to say, the brakes for each pair of wheels are actuated under common control, and from a common source, and both pairs of such brakes may be operated or controlled from a common element or by a common means. The specific arrangement illustrated in the drawing herein, and which will be hereinafter described in detail, comprises a system of hydraulic brakes in which the liquid for the rear pair is delivered to said pair independently of that for the front pair, so that either of said pairs may be controlled independently of the other, but there is provided an interconnection or common control element so that both pairs may be controlled by the same foot of the driver; and by such means the two pairs may be subjected to the same or different amounts of braking action, depending on the manner in which such common control element is operated by the driver.

More specifically, the arrangement is such that both of the control valves for the two pairs of brakes are brought to points close together, and they are connected to a common foot pedal, so that by pressing down on one end of said pedal one of said valves is actuated, and by pressing down on the other end of said pedal the other valve is actuated, and by pressing down on the body of said pedal both valves are actuated. Thus is it possible for the driver to exert differing amounts of braking action on the two sets of wheels, or he may exert the same amount of such action on both sets, thereby giving him a maximum amount of freedom of control of the braking action at all times.

Another feature of the invention relates to the provision of an arrangement whereby the power for actuating the brakes may be supplied by oil or other liquid which is stored up under pressure in a suitable tank or tanks, so that when the valve or valves are operated such liquid may be delivered to the brake cylinders under the controlled pressure, and without the exertion of as much work or effort on the part of the driver as would otherwise be needed. This will result in a power operation which will greatly relieve the driver of an onerous burden, especially in the case of heavy vehicles such as trucks and buses.

Still more specifically, in this connection it is a further object to provide two or more pressure supply tanks in which the operating liquid is stored up under different amounts of pressure, so that two or more amounts of pressure supply are always available. These are so connected to the control valves that for normal braking operations the low pressure supply is used, the same being of sufficient amount to give normal braking actions; but in the case of emergency operations the high pressure supply is brought into action merely by further actuation of the control valves, so that an extreme amount of braking resistance is created. By the foregoing double or plural arrangement it is possible to take care of all normal braking conditions without subjecting the system and apparatus to excessive strains or danger thereof; while at the same time giving to the driver the necessary power to exert the fullest braking action which is possible with the weight and design of the vehicle.

Still more specifically, it is an object of the invention to provide a single pumping means for supplying the liquid under pressure for the system, and to associate therewith a suitable valve arrangement to ensure delivery of the correct maximum pressures into the two or more liquid storage chambers. The arrangement is such that when both chambers have reached the upper pressure limit for the low pressure chamber, the said chamber is cut out, but the delivery of pressure into the high pressure chamber continues until it reaches its upper limit of pressure. Whenever the low presure chamber falls below the desired point said chamber is cut back into the system so that the pressure therein is again built up to the desired point, whereupon it is again cut out.

Another feature of the invention relates to the combination of the liquid pressure storage supply chambers with an oil or other liquid transmission device for the vehicle and with the engine of the vehicle in such a manner that the oil will be placed under pressure by said engine or by said transmission, during coasting and other operations such as braking, so that the necessary power therefor will be recuperated from the momentum of the vehicle.

The changes of temperature of the fluid cause corresponding changes in its volume owing to its coefficient of temperature expansion. In the case of oils suitable for use in the present machine, these changes of volume may be quite substantial. Furthermore, in order to insure a most satisfactory operation of the machine at all times, the device itself should at all times be kept completely filled with the fluid. This will also prevent aeration.

Therefore, a further object of the invention is to provide in connection with the device a suitable enriching chamber, or at any rate an expansion chamber into and from which the fluid may flow in order to take up for changes in its volume due to change of temperature as well as for other purposes. It is a further object to make this expansion tank or compensating tank of proper capacity with regard to the needs of the system so as to keep the system always filled with fluid and without entrapment of air.

Figure 2:
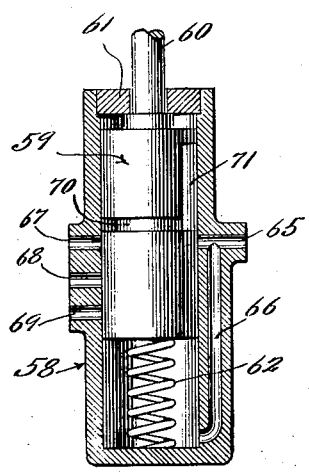
Figure 3:
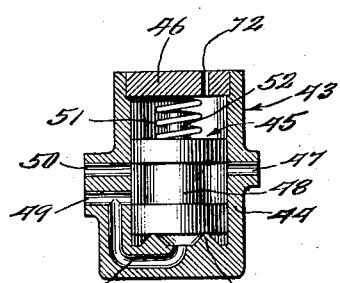

Other objects and uses of the invention will appear from a detailed description of the same, which consists in the features of construction, and combinations of parts hereinafter described and claimed:

Referring to the drawing:

Fig. 1 shows more or less diagrammatically a layout incorporating the features of the invention, showing the same as applied to a hydraulic brake system of the four wheel type, in which the two sets of wheels are provided with valves, etc. to enable the systems of controls referred to;

Fig. 2 shows a longitudinal cross section through a plunger and control valve for one set of wheels, said plunger and valve being so arranged that it gives a reaction to the foot of the driver, exactly in proportion to the braking effort being exerted on the wheels; and Fig. 3 shows a longitudinal section through a cut-out valve for controlling the delivery of liquid under pressure to the low pressure storage chamber.

This application is a division of my co-pending application for Letters Patent of the United States, Serial No. 650,773, filed July 11, 1923, and which will become Letters Patent of the United States No. 1,657,603 on January 31, 1928. In that application there is disclosed a form of Oil transmission for vehicles, and the same makes use of a centrifugal pump driven by the engine and a turbine or turbines for delivering the power to the drive shaft of the vehicle. When the vehicle is coasting or is being braked, said turbine may be driven by the momentum of the vehicle, and at such times it will act as a centrifugal pump, and may be used to deliver oil under pressure, by which operation there is a recuperation of power, and the oil may be stored under pressure without the loss of power in this operation. Or the oil may be placed under pressure by the centrifugal pump driven by the engine.

Referring first to Fig. 1, the four wheels of the vehicle are designated by the numerals 10, 11, 12 and 13, respectively. The wheels 10 and 11 are the front wheels, and the wheels 12 and 13 are the rear wheels. These wheels have the brake drums 14, 15, 16 and 17 respectively. For purposes of simplicity in illustration but not as a matter of limitation, I have shown the brake drums as being provided with the brake straps or bands, 18, 19, 20 and 21, respectively; and these bands are shown as being anchored at one end, and as being provided with the liquid pressure actuated plungers for applying the braking pressures to their other or free ends. These are the plungers 22, 23, 24 and 25, and they are located in the cylinders 26, 27, 28 and 29, respectively said cylinders being referred to in the claims as containers for liquid. Springs in the cylinders tend to release the brakes when the liquid pressures are released therefrom.

The oil transmission device already referred to is shown at 30. The details thereof are not given herein for the reason that said device is in the present case used only as a means for providing the supply of oil under pressure generated by a suitable power supply, as distinguished from creating said pressure by means of the power of the driver himself. Any suitable form of power driven pump may be substituted for the transmission mechanism, and as far as certain features of the present invention are concerned, the power driven pump may be dispensed with and other brake operating power may be used.

The transmission has its pump connected at one end to the vehicle engine by the shaft 31 and at the other end it has its turbine connected to the drive shaft of the vehicle, 32, said drive shaft being of course connected to the driving wheels of the vehicle so that it drives or is driven by said wheels. Within said transmission there is a turbine connected to the shaft 32 and rotating therewith as shown, for example in Patent No. 1,657,603 aforesaid. As the vehicle coasts or is being braked said turbine may act as a centrifugal pump to deliver oil under pressure through the connections 34. The centrifugal pump may deliver oil under pressure to a connection 33. The connections 33 and 34 are provided with check valves 33a and 34a allowing flow of oil to the pressure tanks and the connections 33 and 34 both lead to a common connection 35 so that said common connection may receive oil under pressure from either the engine driven pump or the drive shaft driven turbine. The oil returned to the transmission reaches it through the connection 36. Generally there is provided a surge or storage chamber 37 to accommodate a relatively small supply of oil for the system, and said chamber will receive excess oil as the same is returned to the system from the brake cylinders, and will deliver the same to the pumping device or transmission as fast as needed. The surge chamber 37 is connected to the return side of the transmission by the connection 38.

There are provided the oil pressure chambers 39 and 40. These are of such construction that the oil will be retained therein under pressure of air compressed and entrapped in their upper portions. The chamber 39 is for the low pressure oil, and the chamber 40 is for the higher pressure oil. These oil pressure chambers thus constitute power pneumatic or compressed air means for applying pressure to the liquid in the system. Leading from the connection 35 which delivers the oil under pressure from the pump there are the connections 41 and 42 which deliver to the two pressure chambers. A valve 43 is placed at the point of connection of these connections 41 and 42 with the connection 35, said valve being for the purpose of cutting out the low pressure chamber when the pressure therein reaches the desired upper limit, and for again cutting in said chamber when its pressure falls below the desired low limit. The details of this valve are shown in Fig. 3.

The valve 43 is provided with a casing 44, within which is a plunger 45. The upper end of the casing is closed by a plug 46. At one side of the casing is provided an inlet connection 47 for the oil coming from the pump (to receive the connection 35). The plunger is provided with an encircling groove 48 which is normally positioned opposite to the opening for the connection 47, and which establishes communication across the plunger to the delivery port connections 49 and 50. These are to receive the connections 41 and 42 respectively which lead to the low and high pressure chambers 39 and 40 respectively.

There is a spring 51 above the plunger 45 which tends to force said plunger down to its lowermost stop as shown in Fig. 3, and at that position both of the ports 49 and 50 are in communication with the port 47 so that oil under pressure from the pump will be delivered to both of the pressure chambers 39 and 40. When the plunger rises against the force of the spring its upward movement is limited by a lug 52 on the top of the plunger which strikes against the cover plate 46. At this upper limit of movement the plunger cuts off the port 49 for the low pressure chamber but still leaves the port 50 for the high pressure chamber uncovered. Thus delivery of oil under pressure to the low pressure chamber will be discontinued, but will be continued to the high pressure chamber.

The upward movement of the plunger is caused by the accumulation of pressure within the low pressure chamber itself. For this purpose there is provided a passage 53 which leads from the low pressure port 49 to a position beneath the plunger so that the bottom face of the plunger is subjected to the pressure existing in the low pressure chamber. The area of the bottom face of the plunger which will be subject to this pressure when the plunger is in the lowered position may be restricted if desired by the presence of an upstanding flange 54 against which the plunger normally seats; but as soon as the plunger starts to rise away from this flange the full area of its bottom face will be exposed to the pressure existing in the low pressure chamber, and due to this sudden increase of area there will be a sudden increase of upward force so that the plunger 45 will be snapped up quickly into the position where the low pressure chamber is cut off, leaving the high pressure chamber still in connection with the supply connection 47.

Conversely, when the pressure within the low pressure chamber falls to such a point that the upward pressure on the full bottom area of the plunger is not sufficient to retain the plunger up against the force of the spring 51, said spring will suddenly move the plunger down to the bottom position against the flange 54 where the area subjected to the pressure existing within the low pressure chamber is reduced, and then the plunger will remain in this position until the pressure within the low pressure chamber has again been built up to the desired point. Thus it is possible to cut the low pressure chamber in and out and retain its pressure within a suitably narrow range of variations, and at the same time the high pressure chamber will always be given the full pressure existing within the supply line.

There are provided the control plungers and valves 55 and 56 for the two sets of brake cylinders for the front and rear wheels respectively. The construction of these plungers and valves will be disclosed in detail hereinafter, but they are so arranged that they will control the delivery of the oil under pressure to the brake cylinders. These two valves may be controlled either independently or together, and either manually or by foot action or in any other convenient way. In the particular arrangement illustrated, there is a foot pedal 57 which is pivotally connected to the plungers of the two valves so that by depressing said foot pedal the valves will be controlled. By depressing the front portion of the pedal the plunger of the valve 55 will be depressed, and by depressing the rear portion of the pedal the plunger of the valve 56 will be depressed, and correspondingly, depression of the front portion of the pedal will result in delivery of pressure oil to the front brake cylinders, while depression of the rear portion of the pedal will result in delivery of pressure oil to the rear brake cylinders. Thus the operations of the pedal are naturally related to the desired braking actions since in the normal operation the pedal will be depressed in a more or less uniform manner, that is, to the same degree at both its front and rear portions, thereby ensuring equal braking actions on all four wheels. On the other hand, in case of some emergency, such as a tendency to skid in a specific manner, it might be desired to completely release the rear or the front wheels, but to maintain the braking action on the front or the rear wheels as the case may be; to accomplish which result it is only necessary to release the pressure from the front portion or the rear portion of the pedal, and allow the same to rise to the released position. The possible combinations of movements which may be secured with this arrangement will be appreciated by one skilled in the art, and from an examination of the arrangement in detail.

One of the control plunger valves 55 or 56 is shown in detail in Fig. 2. The same includes a chamber 58 within which there is a plunger 59. Said plunger has the upwardly extending stem 60 which reaches up and out through the chamber cover 61. A spring 62 tends to raise the plunger to the top position, but said spring may be of relatively light construction so as to exert only a small force.

At one side of the chamber 58 there is a delivery connection 65 which receives the pipe connected to the brake cylinders of either the front or the rear pair as the case may be. Formed in the wall of the chamber member there is a passage 66 which has its upper end in communication with the delivery connection, and its lower end communicating with the space beneath the plunger. Thus the bottom of the plunger is always subjected to an up thrust equal or proportional to the pressure existing in the delivery connection, and therefore equal or proportional to the braking pressure existing within the cylinders. Thus there is created a reaction on the driver's foot which is always proportional to the braking action which is being exerted, and the driver therefore has a "feel" in the operation of the brakes, similar to that which he experiences when operating ordinary mechanical brakes or hydraulic brakes in which the force and power to place the liquid under pressure is created always and exclusively by the driver himself.

At another point in the chamber casing 58 there are the three ports or connections 67, 68 and 69. These connect respectively to the return connection by which the oil is returned to the pump or to the surge tank; to the low pressure chamber 39; and to the high pressure chamber 40, when one is provided. The plunger is provided with a groove or recess 70 which extends across the plunger to the delivery connection side thereof; and there is also provided a vertical slot 71 in the delivery side of the plunger which slot 71 connects with the groove 70. Said slot 71 will come into communication with the port 65 just after the plunger moves down from its uppermost position, and such communication between the slot 71 and the port 65 will be maintained during the further downward movements of the plunger.

The arrangement is such that when the plunger stands at the uppermost limit of its movement, as shown in Fig. 2, the port 65 is cut off from all of the ports 67, 68 and 69. Just after the plunger commences its downward movement from its top position, the port 65 comes into communication with the discharge port 67 so that the first action is to place the brake cylinders in communication with the surge tank. As the downward movement continues, the groove 70 passes away from the discharge port 67, and the groove will thus be sealed by the face of the cylinder 58 between the ports 67 and 68. This face is of substantially greater length than the width of the groove 70, measured in the direction of plunger travel so that there will be sealing action during which the groove 70 is sealed, thus also sealing the port 65 and the brake cylinders from all of the ports 67, 68 and 69.

When the downward movement of the plunger has carried the groove 70 over the lap between the ports 67 and 68, it will come into communication with the low pressure port 68, thus subjecting the brake cylinders to low pressure oil then braking action by power will commence. When the desired braking action has been created as indicated by the "feel" on the driver's foot, the brake pedal will be released slightly to allow the plunger to move up far enough to cut off the further supply of low pressure oil to the brake cylinders, and not far enough to allow the oil to be discharged from the brake cylinders. The braking action will thus be held at fixed amount until the driver wishes to either increase or decrease the same. Increase of braking action may be secured by depressing the brake pedal slightly to allow a further amount of oil to be forced into the brake cylinders, with corresponding increase of the "feel". Decrease of braking action may be secured by allowing the pedal to rise thus causing a slight decrease in pressure in the brake cylinders and allowing the return flow of a small quantity of liquid from the brake cylinders to the space below the plunger 59. When the pedal has risen sufficiently to cause communication of the port 65 with the discharge port 67, the oil will further discharge from the brake cylinders and the upward thrust on the foot pedal will decrease, thereby decreasing the "feel" and the driver can thus know when he has accomplished the desired amount of reduction of braking effort.

In emergency cases the pedal may be depressed an amount sufficient to place the port 65 in communication with the high pressure port 69, so as to secure an amount of braking action greater than that which may be secured by the use of low pressure oil. The action will in such case be similar to that already explained, as far as the increase of braking action is concerned. By this arrangement it is thus possible to apply first a limited amount of pressure from the low pressure chamber 39 to the liquid in the cylinders 26, 27, 28 and 29 and thereafter utilize the additional power pneumatic means of the higher pressure chamber 40 for thus applying separately and successively a greater pressure to the liquid in said cylinders. In the case of decreasing the braking action, however, the oil from the brake cylinders may be delivered into the low pressure chamber, at least partially, in case the pressure existing in the brake cylinders was greater than that in the low pressure chamber. Otherwise the discharged oil will go to the surge tank, since no discharge will occur until the pedal has been released sufficiently to place the port 65 in connection with the port 67.

It should be noted that the cap of the chamber 43 may be provided with a vent passage 72, and the cap of the chamber 58 with a vent passage around the stem 60, to allow upward movements of the plungers without obstruction due to any oil which may have seeped up past the plungers.

As shown the two front wheel brake cylinders 26 and 27 are connected together by a pipe 74, which in turn connects by a pipe 75 with the port 65 of the control valve 55. Likewise, the two rear wheel brake cylinders 28 and 29 are connected together by a pipe 76, which in turn connects by a pipe 77 with the port 65 of the control valve 55. Also the two return ports 67 of the two control valves are connected together by a pipe 78 which in turn connects by a pipe 79 with the surge tank and with the inlet side of the pump. Also the two low pressure ports 68 of the two control valves are connected together by a pipe 80 which in turn connects by a pipe 81 with the low pressure chamber. Also the two high pressure ports 69 of the control valves are connected together by a pipe 82 which in turn connects by a pipe 83 with the high pressure chamber.

If desired, there may be provided a pressure gauge 84 located at a convenient point, as for example on the dashboard of the vehicle for indicating the pressures existing in various parts of the system. This gauge may be used, for example, to show the pressure in the low pressure tank, or in the front wheel brake cylinders, or in the rear wheel brake cylinders. For such purposes there are provided the pipes 85, 86 and 87 in connection with the low pressure chamber, the front wheel brake cylinders, and the rear wheel brake cylinders, respectively. Said pipes lead to a common valve 88 placed at a convenient point for adjustment by the driver, and which valve makes it possible for the driver to select which of the desired pressures he wishes to ascertain by the gauge reading.

I have also provided means for placing the brake cylinders under oil pressure independently of the brake pedal 57, so as to hold the brakes in set condition, for example when the car is standing on a grade and independently of the depression of the foot pedal. Such means comprises the pipe 89 which connects the pipes 75 and 77 with the high pressure oil pipe 83; and there are provided the valves 90 and 91 in said pipe 89 for controlling the movement of oil to either the front or the rear wheel brake cylinders. Said valves are normally closed so that the delivery of oil to the brake cylinders is normally under strict control of the foot pedal, but in cases when it is desired to lock the brakes, these valves 90 and 91 may be manipulated to admit the oil to the brake cylinders. Said valves do not need to provide for any release of the oil from the brake cylinders, since after the valves 90 and 91 have been closed, so as to cut off any further delivery of oil from them to the brake cylinders, the slight depression of the foot pedal will allow the oil to escape from the brake cylinders and thus release the brakes.

It is to be noted that the oil pressure chambers 39 and 40, are preferably closed, with the inlet and discharge pipes reaching close to their bottom portions, so that when the oil is forced into said chambers the air trapped therein will be compressed in the upper portions of the chambers and will serve as a cushion tending to deliver the oil as needed and under the pressure determined by the amount of such air compression.

It will also be noted that I have herein provided a braking system in which the oil or other liquid may be stored up under pressure from a pump driven by power other than that of the driver and which oil under pressure may be thereafter delivered to the brake cylinders under control of the driver by means of valves which are so constituted that said valves will give to the driver a "feel" proportionate to the liquid pressure which has been built up in the cylinders. Also, it will be noted that I have provided a hydraulic brake system in which the plurality of cylinders, each separately connected with separate brakes, are replenished with oil from a suitable tank and from which tank they are cut off by the movement of a plunger in each of the cylinders when the plungers are moved in the proper direction for the application of the brakes.

It will be understood that the driver's foot pedal 57 for operating the brake control valves 55 and 56 is placed at a point convenient of access to the driver when he occupies his usual driver position. Furthermore said pedal may of course be operated in any other convenient manner and it will be understood that in referring to the same as a foot pedal I do not intend thereby to use the word foot as one of limitation. In Fig. 1 I have illustrated the driver's seat more or less diagrammatically at the position 92. It will be noted that the foot pedal 57 for the front and rear brake mechanisms is convenient of access to said driver's seat.

While I have herein shown and described only a single embodiment of the features of my present invention, still I do not intend to limit myself thereto except as I may do so in the claims.

I claim:

1. The combination with a vehicle having front wheels and rear wheels, of fluid brakes for the front wheels thereof, fluid brakes for the rear wheels thereof, a turbine, means for driving the same by the rear wheels to pump fluid, a receptacle for said fluid under pressure, a foot pedal located conveniently to the driver's seat of the vehicle, a valve for the front wheel brakes, a valve for the rear wheel brakes, operative connections from said foot pedal to both of the valves whereby said valves may be operated independently of each other by independent operation of the two ends of the foot pedal or together by simultaneous operation of both ends of the foot pedal, fluid connections from the valves to their respective brake mechanisms, and fluid connections in conjunction with the brake mechanisms for returning fluid to the system, substantially as described.

2. The combination with a vehicle having wheels, of a fluid operated brake for each wheel thereof, a receptacle for fluid under pressure, a receptacle for return fluid, pumping means for placing the fluid under pressure, operative connections from the motor of the vehicle to said pumping means, a valve for the front wheel brakes, a valve for the rear wheel brakes, a foot pedal for operation by the driver, connections therefrom to both of said valves, connections from the pressure fluid receptacle to the valves, connections from the valves to the respective brake cylinders of the wheel brakes, and connections from the valve to the return fluid receptacle, each valve having a reaction plunger therein operable in opposition to the pressure of the foot pedal, and having a passage from the connection leading to the brake cylinder to said plunger, whereby the reaction on the plunger is proportional to the fluid pressure in the corresponding brake cylinder, substantially as described.

3. The combination with a vehicle having wheels, of a fluid operated brake for the wheels thereof, means for placing fluid under pressure, a valve for the fluid operated brake, a connection thereto operable by the driver, connections from the pressure means to the valve, connections from the valve to the brake, and means for returning the valve and the driver's connection aforesaid towards the inoperative position with a force substantially proportional to the fluid pressure exerted on the brake, substantially as described.

4. The combination with a vehicle, of means for storing fluid under pressure, fluid operated brakes for the vehicle, an operator controlled valve, connections between said valve and the storage means and the brakes, whereby fluid and fluid pressure may be transmitted to the brakes to operate the brakes and whereby excess fluid may be returned to the storage means, and other connections for placing the brakes in direct connection with the pressure storage means as an emergency operation, substantially as described.

5. The combination with a vehicle having wheels, of fluid brakes for the front wheels thereof, fluid brakes for the rear wheels thereof, a receptacle for fluid under pressure, a foot pedal located conveniently to the driver's seat of the vehicle, a valve for the front wheel brakes, a valve for the rear wheel brakes, operative connections from said foot pedal to both of the valves whereby said valves may be operated independently of each other by independent operation of the two ends of the foot pedal or together by simultaneous operation of both ends of the foot pedal, fluid connections from the valves to their respective brake mechanisms, and fluid connections in conjunction with the brake mechanisms for returning fluid to the system, substantially as described.

6. The combination with a vehicle having brakes, of a fluid operated brake for each wheel thereof, a receptacle for fluid under pressure, a receptacle for return fluid, pumping means for placing the fluid under pressure, a valve for the front wheel brakes, a valve for the rear wheel brakes, a foot pedal for operation by the driver, connections therefrom to both of said valves, connections from the pressure fluid receptacle to the valves, connections from the valves to the respective brake cylinders of the wheel brakes, and connections from the valve to the return fluid receptacle, each having a reaction therein operable in opposition to the pressure of the foot pedal, and having a passage from the connection leading to the brake cylinder to said plunger, whereby the reaction on the plunger is proportional to the fluid pressure in the corresponding brake cylinder, substantially as described.

7. The combination with a vehicle having front wheels and rear wheels and a driver's seat, of brake mechanism for the front wheels thereof, fluid brake mechanism for the rear wheels thereof, fluid operating means for the front wheel brake mechanism, operating means for the rear wheel brake mechanism, a foot pedal located conveniently to the driver's seat of the vehicle, operative connections from one end of said foot pedal to the operating mechanism for the front wheel brakes, and operative connections from the other end of said pedal to the operating mechanism for the rear wheel brakes, substantially as described.

8. The combination with a vehicle having front wheels and rear wheels, of brake mechanism for the front wheels thereof, brake mechanism for the rear wheels thereof, a single device for the normal operation of all of said brake mechanisms, and means including independent connections therefrom to said brake mechanisms operative effectively to operate either or both of the said brake mechanisms in controlled amount according to the movements of said single control device, substantially as described.

9. In a brake system for vehicles, a gas and liquid reservoir, means to maintain in said reservoir a predetermined volume of liquid, and also gas at a predetermined pressure, braking means and a conduit including an operating valve between said reservoir and braking means.

10. The invention defined in claim 9, there being a fluid return pipe from said operating valve to said first named means whereby fluid used in applying the brake passes from the reservoir, through the conduit, and is restored to the reservoir upon reverse of the braking.

11. The combination with a vehicle having front wheels and rear wheels, of brake mechanism for the front wheels thereof, brake mechanism for the rear wheels thereof and means including a lever connected to both sets of brake mechanism for operating both of said brake mechanisms, and permitting operation of the front wheel brake mechanism without operation of the rear wheel brake mechanism, substantially as described.

12. The combination with a vehicle having front wheels and rear wheels and a driver's seat, of brake mechanism for the front wheels thereof, speed control mechanism for the rear wheels thereof, a foot pedal located conveniently to the driver's seat of the vehicle, connections from said foot pedal to the front wheel brake mechanism, connections from said foot pedal to the rear wheel speed control mechanism, and including means whereby either or both of said connections may be actuated by movements of the foot pedal under control of the driver, substantially as described.

13. The combination with a vehicle having front wheels and rear wheels and a driver's seat, of brake mechanism for the front wheels thereof, speed control mechanism for the rear wheels thereof, a foot pedal located conveniently to the driver's seat of the vehicle, and means including independent connections therefrom to the said brake mechanism and to the said speed control mechanism whereby either or both of said devices may be actuated by movements of the foot pedal under control of the driver, substantially as described.

14. In a motor vehicle having two sets of brake devices, the combination of means for operating either set of fluid controlling braking devices independently of the other set, and common means for operating both sets of fluid controlling means simultaneously, and for increasing the braking pressure on either set at any time as desired while retaining the previously developed braking pressure on the other set.

15. In a motor vehicle the combination of two sets of braking devices, means including a pedal connected to both sets for operating one set independently of the other set, and means including said pedal and said first named means for operating both sets of braking devices conjointly in any desired proportion, substantially as described.

16. In a fluid control system, a part to be operated, a cylinder, a piston therein connected to said part, an engine for propelling the vehicle on which said system is installed having a pump for pumping a nonfreezing hydraulic fluid, such as the lubricating oil of the engine, for providing a source of pressure fluid supply, a pressure reservoir supplied by said engine when the latter is running and maintaining the fluid under a reserve pressure by a cushioning means, such as compressed air, for use when the engine is idle, and a manually controlled valve for admitting pressure fluid from said reservoir to said cylinder.

17. In a fluid control system, a part to be operated, a cylinder, a piston therein connected to said part, an engine having a pump driven thereby to provide fluid under pressure for the system, a reserve pressure tank, a check valve between said tank and said engine for trapping pressure in said tank for use where said engine and pump are idle, and a manually controlled valve for admitting pressure fluid from said pump and tank to said cylinder when said engine is running and for admitting pressure from said tank alone when the engine is idle.

18. In a control system of the character described, a source of pressure fluid supply, a cylinder having a piston made operative by said pressure fluid, a valve connected intermediate said source and said cylinder for admitting said fluid pressure to said cylinder, and likewise relieving said pressure fluid from said cylinder, said valve being operable to allow the admittance and the releasing of said fluid pressure through a common line of connection between said valve and said cylinder.

19. In a control system of the character described, a source of pressure fluid supply, a cylinder having a piston made operative by said pressure fluid, a valve mechanism connected intermediate said source and said cylinder, said valve mechanism having means for admitting said pressure fluid to said cylinder in a gradual increase or a gradual decrease in pressure from said source, thereby varying the effect of said pressure upon said piston in said cylinder.

20. In a control system of the character described, a source of pressure fluid supply, a cylinder having a piston made operative by said pressure fluid, a valve mechanism connected, intermediate said source and said cylinder, said valve mechanism having means for admitting said pressure fluid to said cylinder in a gradual increase or a gradual decrease in pressure from said source, thereby varying the effect of said pressure upon said piston in said cylinder, means for releasing said pressure fluid from said cylinder, through the same valve mechanism.

21. In a fluid control system of the character described, an operating piston, a cylinder therefor, a source of pressure fluid supply and manually controlled means for controlling the admission of fluid from said source to said cylinder to operate said piston, operating to introduce fluid under a given pressure upon initial operation of said means, followed by gradually increasing pressure on further operation of said means, and finally the full pressure of said source.

22. In a fluid control system of the character described, an operating piston, a cylinder therefor, a source of pressure fluid supply and manually controlled means for controlling the admission of fluid from said source to said cylinder to operate said piston, operating to introduce fluid under a given pressure upon initial operation of said means, followed by gradually increasing pressure on further operation of said means, and finally the full pressure of said source, the sequence of operations being reversed in the relieving of the pressure of said source in the releasing movement of said means.

23. In a control system of the character described, an operating piston having connection with a part to be operated such as a propeller or brake, a cylinder therefor, and a manually controlled means for supplying pressure to said cylinder to operate said piston, said means serving to introduce a given pressure on the initial operation thereof, followed by gradually increasing pressure and ending up with full pressure at the limit of operation of said means.

24. In a control system of the character described, an operating piston having connection with a part to be operated such as a propeller or brake, a cylinder therefor, and a manually controlled means for supplying pressure to said cylinder to operate said piston, said means serving to introduce a given pressure on the initial operation thereof, followed by gradually increasing pressure and ending up with full pressure at the limit of operation of said means, said means serving on its releasing movement to relieve the pressure to the piston in the reverse order from that first described.

25. In a control system of the character described, a part to be operated such as a propeller or brake, a fluid actuated device associated with said part, a fluid pressure source, a fluid pressure control valve, a line affording communication between said source and said control valve, said line affording communication between said control valve and said fluid actuated device, said control valve when opened permitting free connection between said pressure source and said fluid actuated device by functioning to allow a variation of the pressure supplied to said fluid actuated device.

26. In a pressure fluid control system for vehicles, an actuating control device, a pedal for operating said device when the pedal is depressed, actuated devices at remote points on the vehicle, fluid lines extending from said actuating device to the actuated devices, and means for relieving lines of fluid pressure after the operation of said actuating devices characterized further in that the control device for actuating the actuated devices when the pedal is depressed includes a cylindrical fluid chamber, a plunger in said cylindrical chamber movable longitudinally thereof, and a stem extending through one end of the cylindrical chamber and pivotally connected to the pedal.

27. The combination with a vehicle having wheels, of fluid operated brakes for the wheels of the vehicle, fluid pumping means, power means for operating said pumping means, a return reservoir for fluid, said reservoir being located at such an elevation that fluid may flow therefrom to the fluid pumping means by gravity, and fluid connections between the pumping means and the fluid operated brakes and the return reservoir operative effectively to insure delivery of actuating fluid from the pumping means to the fluid brakes for one operation and to insure return of fluid from the brakes to the return reservoir for another operation, substantially as described.

28. The combination with a vehicle having wheels, of brakes for the wheels of the vehicle, fluid pressure wheel cylinders associated with each of said brakes, fluid pumping means, power means for operating said fluid pumping means, and a reservoir for fluid, and fluid connections from the pumping means to the wheel cylinders effectively to insure operation of said brakes by the use of fluid from said pumping means as one operation and connections between the pumping means and the wheel cylinders and the reservoir operative to insure return of fluid from the brake devices to the pumping means and to the reservoir selectively, substantially as described.

29. The combination with a vehicle having wheels, of fluid operated brakes for the wheels of the vehicle, means for placing fluid under pressure, and a reservoir for the fluid, and connections between the means for placing the fluid under pressure and the fluid operated brakes whereby the brakes may be operated by the pressure of the fluid, and connections between the fluid operated brake devices, the means for placing fluid under pressure, and the reservoir, whereby fluid may be returned from the brake devices to the means for placing the fluid under pressure and the reservoir selectively, substantially as described.

30. The combination with a vehicle having wheels, of fluid operated brakes for the wheels of the vehicle, means for placing fluid under pressure, and a reservoir, and connections between the fluid operated brakes and the means for placing fluid under pressure, whereby the brakes may be operated by the use of such fluid under pressure, and connections between the fluid operated brakes and the means for placing fluid under pressure whereby the fluid may return from the fluid operated brakes to the means for placing fluid under pressure upon releasing of the brakes, and connections between the reservoir and the means for placing fluid under pressure including a single conduit communicating with the reservoir for at times supplying fluid from the reservoir through said conduit to the means for placing fluid under pressure to thereby replenish the fluid for operation of the system, substantially as described.

31. The combination with a vehicle having wheels, of fluid operated brakes for the wheels of the vehicle, means for placing fluid under pressure, and a reservoir, and connections including the fluid operated brakes and the means for placing fluid under pressure, for operating the brakes by the use of such fluid under pressure, and connections including the fluid operated brakes and the means for placing fluid under pressure for permitting the return of fluid from the fluid operated brakes to the means for placing fluid under pressure upon releasing of the brakes, and connections between the reservoir and the means for placing fluid under pressure including a single conduit communicating with the reservoir permitting interchange of fluid back and forth through said conduit between the reservoir and the means for placing fluid under pressure to compensate for expansion and contraction of the fluid with temperature changes and to maintain the connections filled with fluid, substantially as described.

32. The combination with a vehicle having wheels, of brakes for the wheels of the vehicle, fluid pressure wheel cylinders for the brakes, means for placing fluid under pressure, a pedal, and a reservoir, and connections including the pedal, the fluid operated wheel cylinders and the means for placing fluid under pressure, for operating the brakes by the use of such fluid under pressure when the pedal is depressed, and connections including the pedal, the fluid operated wheel cylinders, the means for placing fluid under pressure and the reservoir, for permitting the free interchange of fluid between the means for placing fluid under pressure, the fluid operated brakes and the reservoir only when the pedal is released to a given position and not otherwise, substantially as described characterized further in that the connections for operating the brakes when the pedal is depressed include a cylindrical fluid chamber, a plunger in said cylindrical chamber movable longitudinally thereof, and a stem extending through one end of the cylindrical chamber and pivotally connected to the pedal.

33. The combination with a vehicle having wheels, of fluid operated brakes for the wheels of the vehicle, fluid pressure wheel cylinders for the brakes, means for placing fluid under pressure, a pedal, and a reservoir, and connections including the pedal, the fluid operated wheel cylinders, and the means for placing fluid under pressure, for operating the brakes by the use of such fluid under pressure when the pedal is depressed, and connections including the pedal, the fluid operated wheel cylinders, the means for placing fluid under pressure and the reservoir, for permitting the free interchange of fluid between the means for placing fluid under pressure, the fluid operated wheel cylinders and the reservoir only when the pedal occupies the full brake releasing position and not otherwise, substantially as described characterized further in that the connections for operating the brakes when the pedal is depressed include a cylindrical fluid chamber, a plunger in said cylindrical chamber movable longitudinally thereof, and a stem extending through one end of the cylindrical chamber and pivotally connected to the pedal.

34. The combination with a vehicle having front wheels and rear wheels, of fluid operated brakes for the front wheels thereof including cylinders and plungers working therein, fluid operated brakes for the rear wheels thereof including cylinders and plungers working therein, a fluid line for working pressure fluid connected to the wheel brake cylinders for both front wheels, a fluid line for working pressure fluid connected to both of the wheel brake cylinders for the rear wheels, and means comprising a single foot pedal, and independent fluid pressure connections from said pedal to both of the fluid pressure lines for the brakes of the front wheels and for the brakes of the rear wheels, whereby pressures may be developed independently for the brake cylinders for the front wheels, and for the brake cylinders for the rear wheels.

35. The combination with a vehicle having wheels, of fluid operated brakes for one group of wheels thereof, fluid operated brakes for another group of wheels thereof, and means comprising a foot pedal, and independent fluid pressure connections therefrom to the brakes for the two groups of wheels, whereby pressures may be controlled independently in the brakes of each group.

36. A hydraulic braking system for four wheel vehicles having front wheels and rear wheels and including hydraulic braking means for the front wheels, and hydraulic braking means for the rear wheels, both of said hydraulic braking means being for normal or service stops and means for actuating both of said braking means simultaneously with greater braking effort on the front wheels than on the rear wheels, substantially as described.

37. The combination of a vehicle having front wheels and rear wheels, fluid pressure brake mechanism for the front wheels thereof, fluid pressure brake mechanism for the rear wheels thereof, and means comprising a single lever located conveniently to the driver's seat for controlling both of said front wheel and rear wheel brake mechanisms independently or conjointly in any desired proportion.

38. The combination with a vehicle having a driver's seat and a plurality of brakes, of a receptacle for fluid under pressure, a foot pedal located conveniently to the driver's seat of the vehicle, a valve for one of said brakes, a valve for the other of said brakes, separate operative connections from opposite ends of said foot pedal one to each of said valves whereby said valves may be operated independently of each other by independent operation of the two ends of the foot pedal or together by simultaneous operation of both ends of the foot pedal, and fluid connections from the valves to their respective brake mechanisms.

39. In a vehicle having a plurality of braking devices, common means comprising a foot operating element, links pivotally connected adjacent to the opposite ends of said element, and fluid pressure brake controls connected to said links for operating one of said braking devices independently of another of the said braking devices and for operating all of said braking devices simultaneously.

40. In hydraulic brake apparatus, a plurality of brake applying motors, a plurality of controlling cylinders therefor, plungers in each of said cylinders, and a foot pedal independently and pivotally connected to each of said plungers.

41. In a fluid brake apparatus a pair of brake applying motors, separate fluid connections to each of said motors, a source of fluid under pressure, means for connecting said source of fluid under pressure with either or both of said separate connections, a pressure indicator, and means for connecting said pressure indicator with either of said separate connections or with said source of fluid under pressure.

42. In a fluid brake apparatus, a plurality of brake applying motors, separate connections to each of said motors, a pressure indicator, and means for connecting said pressure indicator separately with either of said motors.

43. In a fluid brake system, a brake motor, a source of fluid pressure having relatively high pressure, a source of fluid pressure having relatively low pressure, and a valve for selectively connecting said brake motor to either of said sources of fluid pressure.

44. In fluid braking apparatus for a vehicle having a front wheel and a rear wheel, a brake for said front wheel, a brake for said rear wheel, a fluid brake motor for said front wheel brake, a fluid brake motor for said rear wheel brake, pistons for said motors each having a substantially equal pressure receiving area, a foot pedal, and means controlled by said foot pedal for generating differing pressures in said motors.

45. In fluid braking apparatus for a vehicle having a front wheel and a rear wheel, a brake for said front wheel, a brake for said rear wheel, a fluid brake motor for said front wheel brake, a fluid brake motor for said rear wheel brake, pistons for said motors, a foot pedal, and means controlled by said foot pedal for generating different amounts of braking pressures in said motors respectively.

46. In a fluid braking system for a vehicle having a pair of driving wheels, and another pair of wheels, brakes for said last named wheels, fluid brake motors for said brakes, brakes for said driving wheels, fluid brake motors for said driving wheel brakes, means for driving said drive wheels, a drive shaft through which said means drives said wheels, a pump, means actuated by said drive shaft for operating said pump, fluid connections between said pump and said motors, and manually controlled valve means interposed in said connection between said pump and said motors.

47. In a fluid braking system, a container for liquid, power pneumatic means for applying a limited amount of pressure to said liquid, and additional power pneumatic means for applying separately and successively a greater pressure to said liquid.

48. In a fluid braking system, a container for liquid, power means for applying a limited amount of pressure to said liquid, and a compressed air power means for applying separately and successively a greater pressure to said liquid.

THOS. A. BANNING, Jr.